US007032460B2

(12) United States Patent
Hinzpeter et al.

(10) Patent No.: US 7,032,460 B2
(45) Date of Patent: Apr. 25, 2006

(54) METHOD FOR TESTING PRESSING TABLETS

(75) Inventors: Juergen Hinzpeter, Schwarzenbek (DE); Ingo Schmidt, Schwarzenbek (DE); Ulrich Gathmann, Hamburg (DE); Joerg Gaedecke, Gessthacht (DE)

(73) Assignee: Fette GmbH, Schwarzenbek (DE)

( * ) Notice: Subject to any disclaimer, the term of this patent is extended or adjusted under 35 U.S.C. 154(b) by 57 days.

(21) Appl. No.: 10/832,618

(22) Filed: Apr. 27, 2004

(65) Prior Publication Data

US 2004/0211265 A1 Oct. 28, 2004

(30) Foreign Application Priority Data

Apr. 28, 2003 (DE) ................................ 103 19 024

(51) Int. Cl.
*G01N 3/08* (2006.01)

(52) U.S. Cl. ........................................................ 73/824

(58) Field of Classification Search ................ 425/182; 73/818, 824, 825

See application file for complete search history.

(56) References Cited

U.S. PATENT DOCUMENTS 2,996,756 A * 8/1961 Korsch et al. .............. 425/145
4,396,564 A * 8/1983 Stuben et al. .............. 264/40.5
6,830,442 B1 * 12/2004 Cecil .......................... 425/107

* cited by examiner

*Primary Examiner*—Max Noori

(74) *Attorney, Agent, or Firm*—Vidas, Arrett & Steinkraus P.A.

(57) ABSTRACT

A method for test pressing tablets by means of a rotary tabletting machine, a rotationally driven rotor which has a series of upper and lower rams, a die-plate with dies with which the rams interact, a control cam system for said rams, and a filling assembly to continuously fill said dies with said rotor rotating, further by means of at least one pressure station at which the material located in said dies is compressed into a tablet, and a measuring device having a plurality of measuring positions which measures at least the compression force applied by said rams and the number of revolutions of said rotor, comprising the process steps of, a pair of rams selected for a single compression procedure is automatically moved to a filling position, a die or limited number of dies is filled with material with said filling assembly removed at least in part and said rotor at stoppage, said rotor is set into rotation subsequently and is sped up such as to have the desired production speed in said pressure station, and said rotor is stopped in said filling position after a revolution and signals or signal sequences of the measuring positions are recorded while the rotor is rotating and are provided to a computer for display and evaluation.

5 Claims, 3 Drawing Sheets

METHOD FOR TESTING PRESSING TABLETS

CROSS-REFERENCE TO RELATED APPLICATIONS

Figure 1:
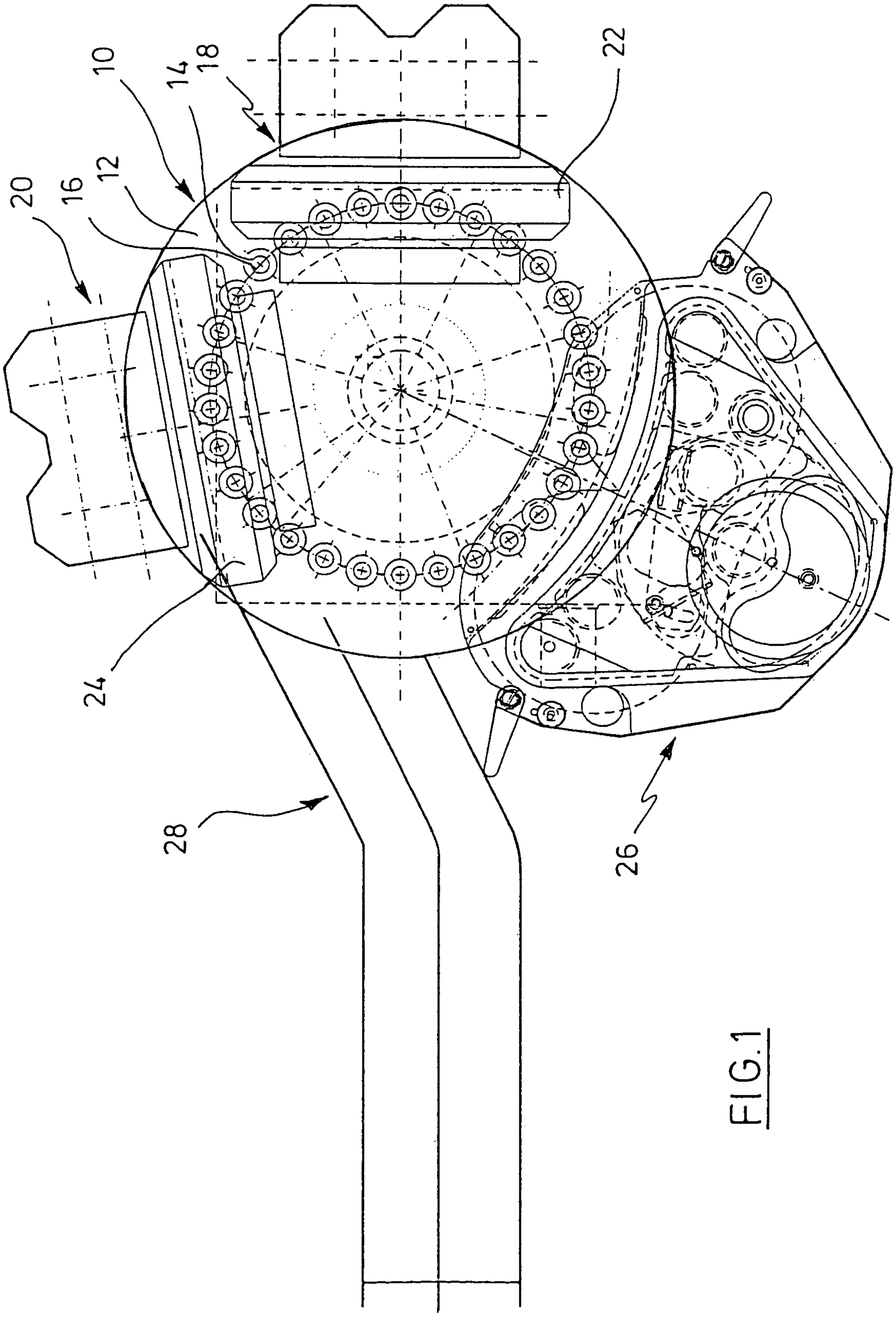

Not applicable.

STATEMENT REGARDING FEDERALLY SPONSORED RESEARCH

Not applicable.

BACKGROUND OF THE INVENTION

It is common to make tablets in rotary tablet presses or rotary tabletting machines. Machines of this kind have a rotor with a die-plate which has a series of dies, further comprise upper and lower rams which interact with the dies, and at least one pressure station in which the rams are forced against the material filled into the die. This is done during the rotation of the rotor, which is driven by an appropriate driving mechanism. Prior to the compaction process, the dies require to be filled with the material to be compacted (powder). This is accomplished continuously, with the rotor rotating, in a so-called feed shoe or a filling assembly the arrangement of which is stationary.

It is known that such a tablet press has associated therewith a measuring device which records substantial data during production and processes it in a plant computer. The data includes the number of revolutions of the rotor, the maximum compression forces in the pressure station and possibly the run of compression forces in the pressure station, i.e. as associated with the individual pairs of rams. Subsequent measure checks of the ejected tablets for their weight, thickness, and hardness will determine whether the desired parameters have been achieved. If not, it is necessary to vary the charge, compression force or the like. Devices and methods for the control and adjustment of tablet presses to obtain optimum results are adequately known in the state of the art.

The development of tablets, inter alia, involves determining the compression characteristic of the material requiring compaction. At this stage, the product volumes which initially are available are very small and, in addition, are very expensive in both production and material so that production loses need to be kept low during compression.

It is known to carry out compression tests using specific laboratory-type presses. Those mostly are minor-size eccentric presses which allow to produce one tablet each in each compression process. Here, the drawback is that such laboratory-type presses exhibit a compression behavior different from than that of rotary tablet presses which are employed for production. This is why the results of the compression tests cannot be readily transferred to a producing rotary press.

The benefit inherent to a producing rotary press is that the data determined during the compression tests can be transferred directly to tablet production. Furthermore, all settings of the rotary press from the compression test can be taken over for use in production.

Common rotary presses have a feed shoe or an adequate filling device as was described above. To allow such a filling assembly to fill the dies with material in a constantly regular fashion its volume requires to permanently be filled with a basic charge of material to undergo compression even if only a small number of tablets is to be produced. Thus, rotary presses always need to maintain an amount of compression material requiring compaction which is larger than is necessary for the compression test proper.

It is the object of the invention to specify a method for test pressing tablets which can be implemented under the conditions of production, on one hand, and can make do at a minimum expense of compression material, on the other.

BRIEF SUMMARY OF THE INVDENTION

In the inventive method, a conventional tabletting machine is employed as is commonly used in production. Therefore, according to the invention, such a machine can be used for testing purposes in the enterprise employing a rotary tabletting machine. To this end, at least one die is filled with compression material with the filling assembly removable at least in part and in a predetermined filling position with the rotor at stoppage. The filling procedure normally is composed of the filling procedure and the proportioning procedure. During the filling procedure, an appropriate control cam segment causes the lower rams, which are within the die, to travel downwards by a certain degree to release a volume of the die for the reception of filling material. Once this filling is done a further control cam segment causes the lower rams to be raised somewhat. Such raising is accomplished into an accurate filling position in which the volume exactly predetermines the charge. Therefore, a small portion of the compression material filled in before is lifted out of the die and is stripped by means of the feed shoe or another filling assembly. It is only then that the compression procedure starts with a main pressure station mostly be preceded by a preliminary pressure station each of which contain a pair of pressure-applying rollers that interacts with the upper and lower rams.

In the inventive method, the rotor is stopped in a position in which a lower ram is in the filling position, i.e. the lower ram exactly predetermines the charge volume in the die. It is not problematic to travel to this position by means of the drive control because it has been known for long to monitor and control the rotation of the rotor by means of appropriate angle detection facilities. Such monitoring is necessary if compression characteristics are to be associated with the individual pairs of rams.

A single die can be filled by hand, for instance, or by means of a specific filling device suited for the operation. The common filling assembly has been removed or moved sidewards to an extent which allows to fill the single die. It is understood that a limited number of dies can also be filled with compression material. This will then require the rotor to move the respective dies to the filling position step by step.

After the die is filled the rotor is set into rotation and is sped up to a degree that it will have achieved the desired production number of revolutions or speed when it reaches the pressure station. If the pressure station has a preliminary pressure station the rotor needs, to have the production speed already in the preliminary pressure station. Large-sized rotary tabletting machines frequently use three pressure stations with three filling assemblies to simultaneously press three tablets each at the same time. In this case, a relatively short length is available for the rotor to reach the production speed. Current drives allow to realize it.

The rotor is stopped in the filling position after a single revolution and it becomes possible now to evaluate the signals or signal runs of the individual measuring positions, e.g. those for the main and preliminary pressures, ejection force, binds, etc. which have recorded measurement values during the revolution, in a computer or the get them displayed by it.

The inventive method allows to obtain a large series of benefits. Since it is necessary to fill only a single die or a very small number of dies with compression material the expense of compression material is very small. The loss of compression material is very small as well. Another substantial benefit of the invention is the one that the results of the test can be applied to every production-scale rotary press and that specific laboratory-type presses are unnecessary to make compression tests.

All settings relevant to the method, e.g. the number of revolutions, compression force, tablet hardness, tablet weight, etc., can be made and tried out in the compression test. A test of the compactability of new tablet shapes merely requires testing a series of different ram shapes which are fitted by pairs in the rotor. Thus, a single revolution of the rotor permits to examine a plurality of different ram shapes.

More benefits are found in the very short resetting times to other compression materials and ram types. The formation of dust during the compression tests is extremely low because of the small amount of compression material.

It is unnecessary to load the rotor with all pairs of rams, but possibly with one pair of rams only. Likewise, it is unnecessary to employ dummy dies as would be the case in using a feed shoe. Mounting and dismounting such dummy dies is an expensive procedure.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The invention will be described in more detail below with reference to the drawings.

FIG. 1 shows a plan view of a schematically illustrated tabletting machine of a conventional structure.

Figure 2:
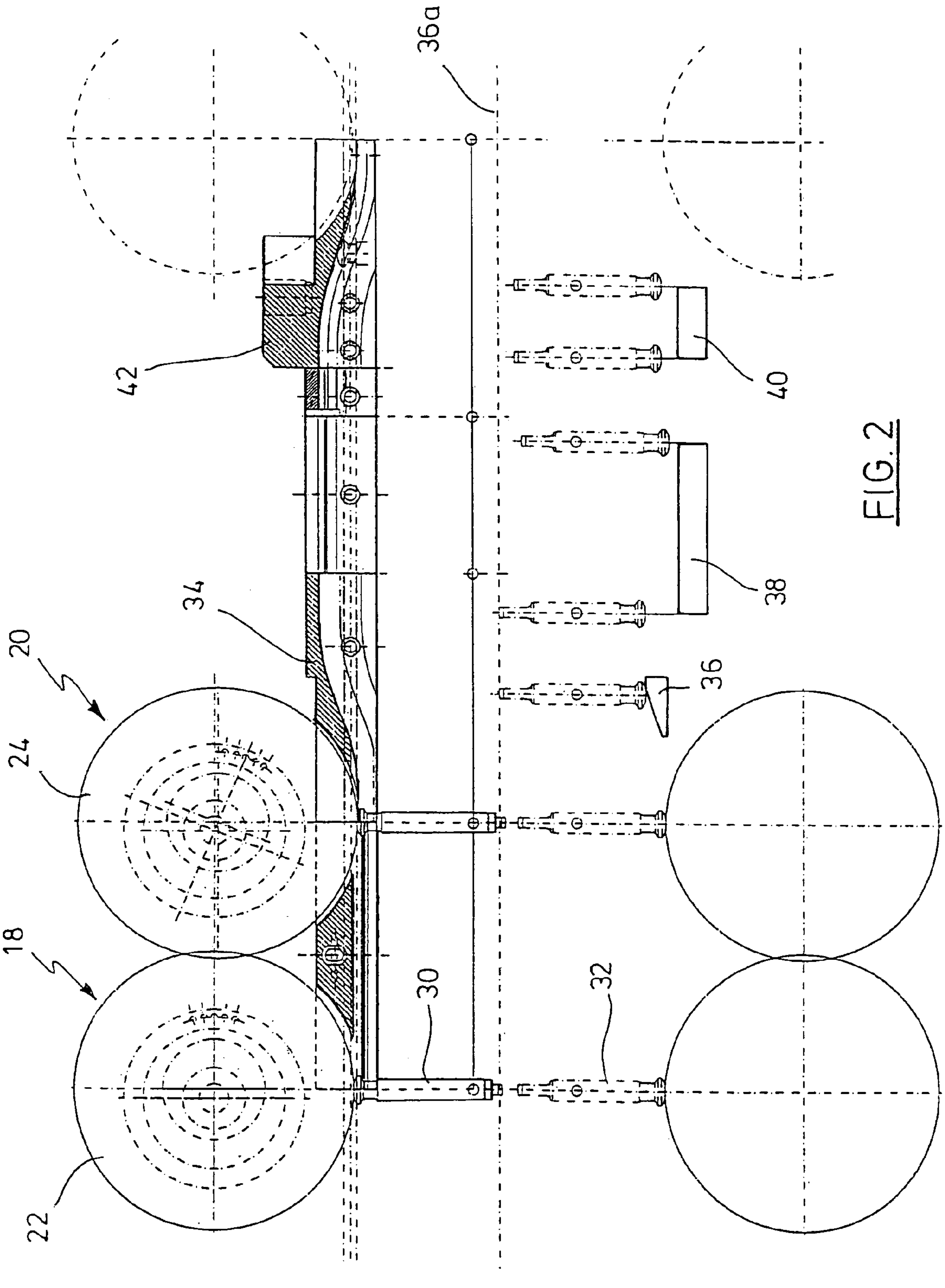

FIG. 2 schematically shows a developed view of the tabletting machine of FIG. 1 with no feed shoe.

Figure 3:
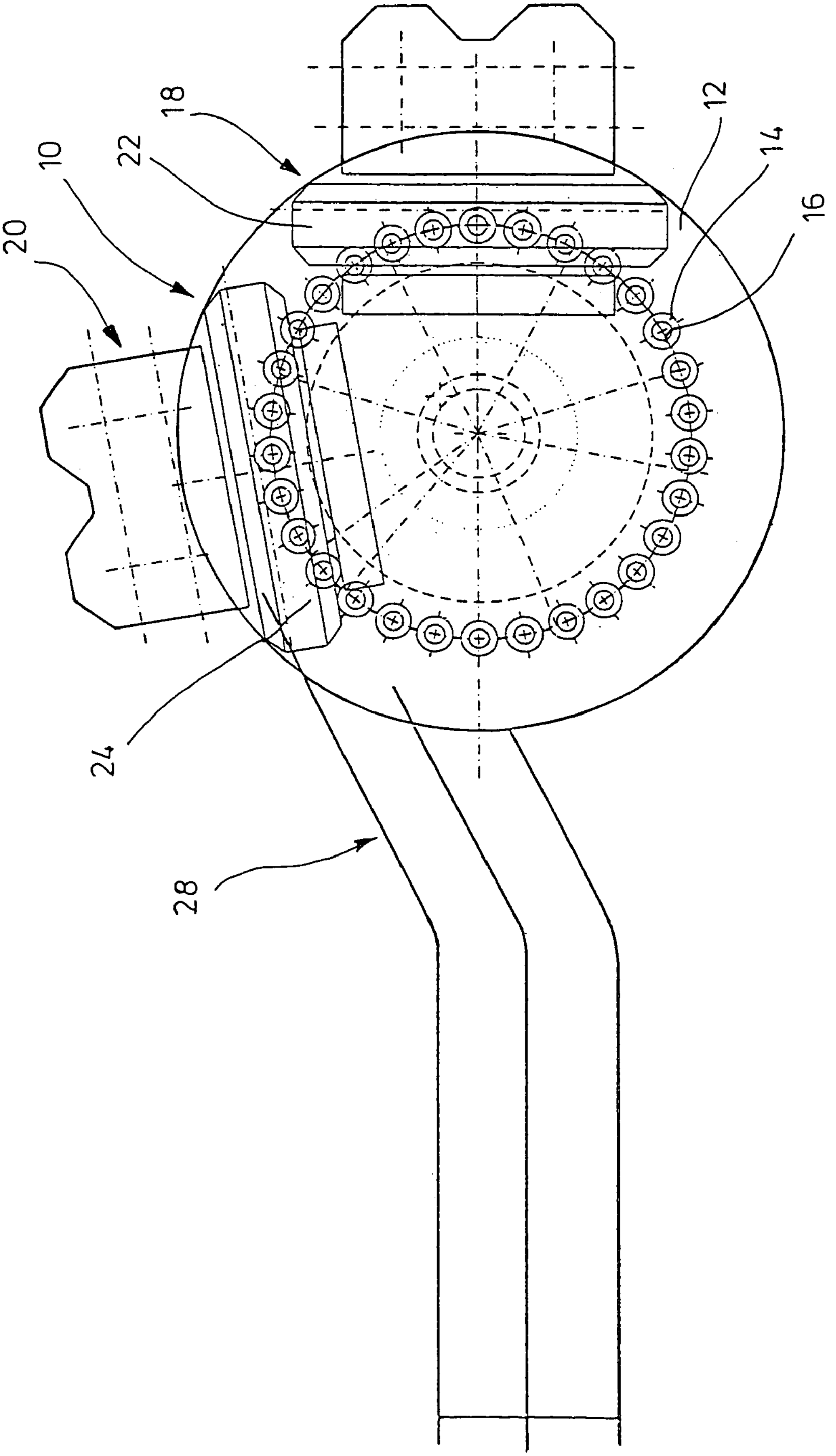

FIG. 3 shows a view similar to that of FIG. 1, but with no feed shoe for the implementation of the inventive method.

FIG. 1 illustrates a rotor 10 of a rotary tabletting machine that has a die-plate 12 with a series of dies 14 which are disposed on a circle around the axis of the rotor 10, including die bores 16 to receive material to be compacted. Each die 14 or die bore 16 has associated therewith an upper ram and lower ram, which are not shown in FIG. 1.

A preliminary pressure station 18 and a main pressure station 20 are stationarily disposed at the circumference of the rotor 10. They exhibit pairs of pressure-applying rollers out of which a lower pressure-applying roller each is illustrated at 22 and 24. The pressure-applying rollers interact with the ram ends facing them in order to force them into the die bores 16 and to compact the material which is therein. A filling assembly 26 is shown located in the sense of rotation in front of the pressure station 18. Reference will not be made to the details of the filling assembly because it is known. The filling assembly which has a certain volume and is continuously filled through a hopper helps in filling the dies which run along each below the filling assembly 26. This movement causes the die bores to be filled by and by with compression material. The tablets finish-pressed in the main pressure station 20 are expelled from the lower rams while the upper rams are found to be above the dies. A stripper (not shown) provides for them to be pushed to a tablet chute 28.

FIG. 2 shows two upper rams at 30 whereas a series of lower rams 32 is shown in phantom lines. It can be recognized that the rams 30, 32 move to the right from the pressure station 18 and take different positions in height relative to the die-plate 12. This is achieved by a control cam 34 for the upper rams 30 and a control cam 36 for the lower rams 30 for ejection. Filling is performed subsequent to the main pressure station 20 with the filling assembly 26 of FIG. 1 not being shown or being removed in FIG. 2. The upper rams 30 present a raised position outside the die bore, the upper side of the die-plate not shown in FIG. 2 being outlined by the phantom line 36*a*. The elongate case 38 suggests the filling section and the case 40 suggests the proportioning section. As is deduced from the position of the lower rams 32 they are caused to gradually move downwards by control cams which are not shown so as to release some portion of the die bore for being filled with compression material. After the position taken farthest downwardly as is outlined by the lower ram 32 in a dash-and-dot line the rams 32 will be re-raised somewhat in the proportioning section 40. With the lower rams 32 in this raised position, the charge volume is defined in the die bore. As a result, a very small portion of the compression material filled in previously is lifted out of the die bore again and can then be stripped, for instance, by the filling assembly 26. Subsequently, the upper rams 30 are lowered by the control cam 42 and caused to run under the next following pressure station, which can be the preliminary pressure station 18 or another preliminary pressure station if more than one preliminary pressure station and main pressure station are provided.

The filling assembly 26 of FIG. 1 has been omitted in the inventive method as is shown in FIG. 3, for instance. For the rest, the tabletting machine of FIG. 3 may have the same components as has FIG. 1. Therefore, the components equal to those of FIG. 1 are given the same reference numbers in FIG. 3.

For the implementation of a compression test, the rotor 10 is brought to a position in which a lower ram 32 is in a filling position as is outlined by 40 in FIG. 2. Now, the die bore 16 is filled with compression material by means of an appropriate filling device or by hand with the rotor 10 at stoppage. The control for the drive of the rotor 10, which is not shown, is adjusted via a computer in such a way that the rotor, after the start-up, is rotated just by one revolution so that the operative pair of rams will be in the filling position again. The acceleration of the rotor drive is adjusted so as to achieve the production speed in the preliminary pressure station 18 already to avoid angles of incline.

During the rotation, appropriate measuring positions which are not shown help take data for the compaction of the material. Those include the rotational speed of the rotor 10 and the compression characteristics in the preliminary and main pressure stations 20, 22 which are measured by means of appropriate pressure transducers and force sensors. The signals of the measuring positions are recorded in the computer and displayed and subjected to evaluation. This manner allows to automatically press a plurality of single tablets successively with process and tablet parameters capable of being automatically adapted after each revolution of said rotor because of the data measured or in response to predetermined variations of the setting parameters to determine optimum conditions of production.

All of the other rams 30, 32 can remain mounted or can be dismounted during the test described. As mentioned before, a single pair of rams is sufficient to carry out pressing tests. It becomes unnecessary to install dummy dies when compression rams are dismounted.

The data obtained in the pressing test can be readily transferred to a tabletting machine operating under the conditions of production.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for test pressing tablets by means of a rotary tabletting machine, which comprises a rotationally driven rotor a series of upper and lower rams, a die-plate with dies with which the rams interact, a control cam system for said rams, and a filling assembly in normal operation to continuously fill said dies in a filling position with said rotor rotating at production speed, further by means of at least one pressure station at which the material located in said dies is compressed into tablet, and a measuring device having a plurality of measuring positions which measures at least the compression force applied by said rams and the number of revolutions of said rotor, the method comprising the process steps below:

a pair of rams selected for a single compression procedure is automatically moved to its filling position, a die or limited number of dies is filled with material with said filling assembly removed at least in part while said rotor is stopped, said rotor is set into rotation subsequently and is sped up such as to have the desired production speed in said pressure station, said rotor is stopped in said filling position after one revolution and signals or signal runs of the measuring positions are recorded while the rotor is rotating said one revolution and are provided to a computer for display and evaluation.

2. The method according to claim 1, characterized in that only one pair of rams or a limited number of pairs of rams are fitted in the rotor.

3. The method according to claim 1, characterized in that the pairs of rams associated with the dies to be filled are of different shapes.

4. The method according to claim 1, characterized in that the tablet and/or process parameters are automatically adapted after each revolution of said rotor because of the data measured or in response to predetermined variations of the setting parameters.

5. A method for test pressing tablets by means of a rotary tabletting machine, comprising the steps of:

providing the rotary tabletting machine, which comprises a rotationally driven rotor a series of upper and lower rams, a die-plate with dies with which the rams interact, a control cam system for said rams, and a filling assembly in normal operation to continuously fill said dies in a filling position with said rotor rotating at production speed, further by means of at least one pressure station at which the material located in said dies is compressed into tablets, and a measuring device having a plurality of measuring positions which measures at least the compression force applied by said rams and the number of revolutions of said rotor;

automatically moving a pair of rams selected for a single compression procedure to their filling position;

filling at least one die with material, with said filling assembly removed, at least in part, and while said rotor is stopped;

rotating said rotor subsequently, and speeding the rotor up such as to have the desired production speed in said pressure station;

stopping said rotor in said filling position, after one revolution, and signals of the measuring positions are recorded while the rotor is rotating said one revolution, and are provided to a computer for display and evaluation.

* * * * *